United States Patent
Park

(10) Patent No.: US 9,148,450 B2
(45) Date of Patent: Sep. 29, 2015

(54) METHOD AND APPARATUS FOR CONTROLLING TELEPHONY SERVICE USING VIRTUAL NETWORK COMPUTING

(75) Inventor: Ho-Yeon Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/588,456

(22) Filed: Aug. 17, 2012

(65) Prior Publication Data

US 2013/0045725 A1 Feb. 21, 2013

(30) Foreign Application Priority Data

Aug. 17, 2011 (KR) .......................... 10-2011-0081934
Sep. 19, 2011 (KR) .......................... 10-2011-0094328

(51) Int. Cl.
| | |
|---|---|
| H04M 3/42 | (2006.01) |
| H04W 4/00 | (2009.01) |
| G06G 7/62 | (2006.01) |
| H04L 29/06 | (2006.01) |
| G06F 9/54 | (2006.01) |
| B60R 25/00 | (2013.01) |
| H04L 12/28 | (2006.01) |
| H04M 3/00 | (2006.01) |
| H04M 1/60 | (2006.01) |
| H04M 1/725 | (2006.01) |
| H04L 29/08 | (2006.01) |

(52) U.S. Cl.
CPC ................ *H04L 65/00* (2013.01); *B60R 25/00* (2013.01); *G06F 9/541* (2013.01); *H04L 12/2803* (2013.01); *H04L 65/1069* (2013.01); *H04M 1/6041* (2013.01); *H04M 1/72533* (2013.01); *H04M 3/00* (2013.01); *H04W 4/008* (2013.01); *H04L 67/125* (2013.01)

(58) Field of Classification Search
CPC ....... G06F 9/4445; G06F 9/542; H04L 12/24; H04L 29/00; H04L 67/04
USPC .................. 719/328; 345/174, 173; 370/338; 455/414.1; 703/17
See application file for complete search history.

(56) References Cited

U.S. PATENT DOCUMENTS

| 8,407,773 B1 * | 3/2013 | Hayter et al. ...................... 726/7 |
| 2002/0065949 A1 | 5/2002 | Heaton |
| 2008/0075049 A1 * | 3/2008 | Xie ................................ 370/338 |

(Continued)

FOREIGN PATENT DOCUMENTS

| EP | 2 254 034 | 11/2010 |
| KR | 1020100121384 | 11/2010 |

(Continued)

OTHER PUBLICATIONS

European Search Report dated Feb. 23, 2015 issued in counterpart application No. 12823705.4-1853.

*Primary Examiner* — William Nealon
(74) *Attorney, Agent, or Firm* — The Farrell Law Firm, P.C.

(57) ABSTRACT

A system and method for controlling a telephony service by a first terminal using Virtual Network Computing (VNC) connected between the first terminal and a second terminal. The method includes establishing a connection with the second terminal for providing the telephony service; establishing a call connection with an external terminal via the second terminal; establishing a VNC connection between the first terminal and the second terminal; and transmitting and receiving data for a call with the external terminal via the second terminal through the VNC connection.

19 Claims, 14 Drawing Sheets

(56) References Cited

U.S. PATENT DOCUMENTS

| | | | |
|---|---|---|---|
| 2009/0063626 A1* | 3/2009 | Nakagawa et al. | 709/203 |
| 2010/0040211 A1 | 2/2010 | Maeng et al. | |
| 2010/0284398 A1 | 11/2010 | Maeng et al. | |
| 2010/0295803 A1* | 11/2010 | Kim et al. | 345/173 |
| 2011/0099374 A1 | 4/2011 | Berrange | |
| 2011/0270600 A1* | 11/2011 | Bose et al. | 703/17 |
| 2012/0324482 A1* | 12/2012 | Park | 719/328 |

FOREIGN PATENT DOCUMENTS

| | | |
|---|---|---|
| KR | 1020100121404 | 11/2010 |
| KR | 1020110028886 | 3/2011 |
| WO | WO 2010/128827 | 11/2010 |

* cited by examiner

```xml
<?xml version="1.0" encoding="utf-8"?>
<cams:callInfo
    xsi:schemaLocation="urn:schemas-upnp-org:phone:cams
      http://www.upnp.org/schemas/phone/cams-v1.xsd
<http://www.upnp.org/schemas/phone/cams.xsd">
    xmlns:xsi="http://www.w3.org/2001/XMLSchema-instance"
    xmlns:cams="urn:schemas-upnp-org:phone:cams"
    xmlns:peer="urn:schemas-upnp-org:phone:peer">
    <callID>unique ID for the Call </callID>
    <targetNames type="type of the targetName">
        unique names or IDs for targets
    </targetNames>
    <callStatus reason="reason why Call Status is changed" >
        status of the Call
    </callStatus>
    < priority>priority of the Call </ priority>
    <remoteParty>
        <   peer:id>ID of the Peer </peer:id>
    </remoteParty>
   < TCList>
       <TC>
           <UDN>uuid:UUID </UDN>
           <mediaSessionID>Unique Media Session ID </mediaSessionID >
       </ TC>
       <!-- Any other TC (if any) go here.-->
   </ TCList>
   < enableMediaMxing>1 or 0 </enableMediaMixing >
   < shareMedia>Media Session ID </shareMedia>
   <mediaCapability format="format of the Media Capability"  >
       Media Capability
   </mediaCapability >
   <nativeMediaCapability format="format of the Native Media Capability"  >
       Native Capability
   </nativeMediaCapability>
   <X_appID>
       Application ID which will be launched
   </ X_appID>
   <X_appCategory>
       Application Category Information
   </X_appCategory>
   <X_contentCategory>
       Content Category Information
   </X_contentCategory>
</cams:callInfo >
```

FIG.5

Table 2-26 : Arguments for AcceptCall()

| Argument | Direction | relatedStateVariable |
|---|---|---|
| TCPName | IN | A ARG TYPE TCPName |
| SecreaKey | IN | A ARG TYPE SecretKey |
| TargetCallID | IN | A ARG TYPE CallID |
| MediaCapabilityInfo | IN | A ARG TYPE MediaCapabilityInfo |
| CallMode | IN | A ARG TYPE CallMode |
| AppID | OUT | A ARG TYPE AppID |

FIG.9

METHOD AND APPARATUS FOR CONTROLLING TELEPHONY SERVICE USING VIRTUAL NETWORK COMPUTING

PRIORITY

This application claims priority under 35 U.S.C. §119(a) to Korean Patent Application Serial No. 10-2011-0081934, which was filed in the Korean Intellectual Property Office on Aug. 17, 2011, and Korean Patent Application Serial No. 10-2011-0094328, which was filed in the Korean Intellectual Property Office on Sep. 19, 2011, the entire disclosure of each of which is incorporated herein by reference.

BACKGROUND OF THE INVENTION

1. Field of the Invention

The present invention relates generally to Universal Plug and Play (UPnP) technology, and more particularly, to a telephony method using UPnP.

2. Description of the Related Art

A UPnP network includes Controlled Devices (CDs) connected to and controlled by an Internet Protocol (IP)-based network, and Control Points (CPs), which are devices that control the CDs.

Based on UPnP technology, UPnP Telephony technology has been created, which transmits received call data to a third device, allowing a user to perform a call using the third device. Generally, a telephony terminal receiving a call serves as a telephony server, and a telephony device receiving call data transmitted from the telephony server serves as a telephony client. A telephony CP forwards the call received at the telephony server to the telephony client.

Additionally, in a car, in addition to using the car for basic transportation, a user may also enjoy various environments in the car. Consequently, infotainment has been developed, in which a user device receives various information by being linked to mobile devices in the car, allowing the user to enjoy multimedia such as music and video.

SUMMARY OF THE INVENTION

The present invention is designed to address at least the above-described problems occurring in the prior art, and to provide at least the advantages described below.

Accordingly, an aspect of the present invention is to provide an improved method and apparatus for performing a UPnP Telephony service in a car head unit by applying a UPnP network between the car head unit and a mobile terminal.

Another aspect of the present invention is to provide a method and apparatus for performing a UPnP Telephony service in a car head unit and a mobile terminal, wherein the car head unit performs the UPnP Telephony service using a UI of the mobile terminal in a VNC environment.

In accordance with an aspect of the present invention, a method is provided for controlling a telephony service by a first terminal using VNC connected between the first terminal and a second terminal. The method includes establishing a connection with the second terminal for providing the telephony service; establishing a call connection with an external terminal via the second terminal; establishing a VNC connection between the first terminal and the second terminal; and transmitting and receiving data for a call with the external terminal via the second terminal through the VNC connection.

In accordance with another aspect of the present invention, a method is provided for controlling a telephony service by a second terminal using VNC connected between a first terminal and the second terminal. The method includes establishing a connection with the first terminal to provide the telephony service with the first terminal through the VNC; establishing a call connection between the first terminal and an external terminal; establishing a VNC connection between the first terminal and the second terminal; and transmitting data for a call to the first terminal and the external terminal.

In accordance with another aspect of the present invention, a first terminal is provided for controlling a telephony service using VNC connected between the first terminal and a second terminal. The first terminal includes a telephony controller that controls a connection with the second terminal for providing the telephony service, controls call processing via the second terminal, and transmits and receives data for a call with an external terminal, via the second terminal; a application controller that controls running an application in the second terminal to provide the telephony service; and a VNC controller that establishes a VNC connection with the second terminal.

In accordance with another aspect of the present invention, a second terminal is provided for processing a telephony service using VNC connected between a first terminal and the second terminal. The second terminal includes a telephony processor that provides a connection with the first terminal to provide the telephony service, provides a call between the second terminal and an external terminal to the first terminal, and transmits data for a call to the first terminal and the external terminal; an application processor that runs an application to provide the telephony service; and a VNC processor for establishing a VNC connection with the first terminal.

BRIEF DESCRIPTION OF THE DRAWINGS

The above and other aspects, features, and advantages of certain embodiments of the present invention will be more apparent from the following description taken in conjunction with the accompanying drawings, in which:

FIG. 5 illustrates an example of a call notification message according to an embodiment of the present invention;

FIG. 9 illustrates an example of a call approval response message according to an embodiment of the present invention;

Throughout the drawings, the same drawing reference numerals will be understood to refer to the same elements, features, and structures.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
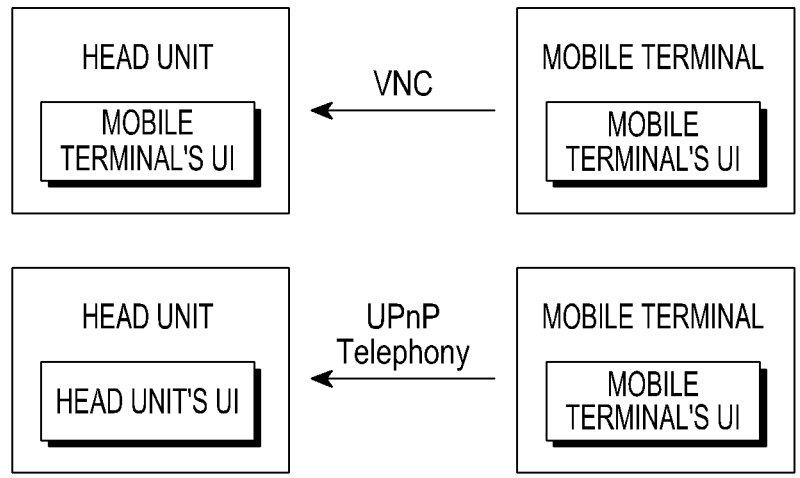
FIG. 1 illustrates conventional User Interface (UI) configurations for a first terminal and a second terminal that use UPnP Telephony.

FIG. 1 illustrates conventional UI configurations for a first terminal and a second terminal that use UPnP Telephony.

Referring to FIG. 1, generally, in UPnP Telephony technology, devices equipped with a Telephone CP and/or a telephony client use the UPnP Telephony technology with their own User Interfaces (UIs). That is, in the prior art, even though a first terminal (e.g., a car head unit) and a second terminal (e.g., a mobile terminal) are connected through Virtual Network Computing (VNC), the first terminal and the second terminal enable and operate their own configured UIs in order to perform a UPnP Telephony service. This often creates compatibility problems between the first terminal and the second terminal and a number of inconveniences for a user.

However, because the first terminal and the second terminal are connected through VNC, it is preferable for the first terminal (e.g., the car head unit) to perform the UPnP Telephony service using the UI of the second terminal (e.g., the mobile terminal) in the VNC environment, even when performing the UPnP Telephony service.

Figure 2:
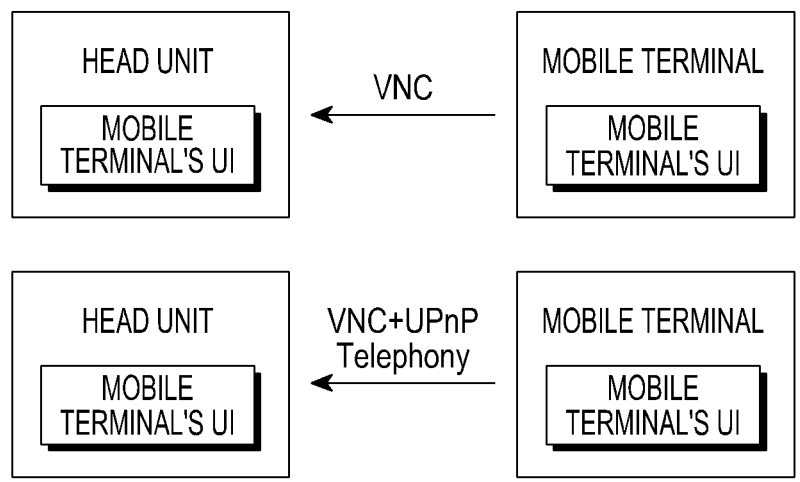
FIG. 2 illustrates UI configurations for a first terminal and a second terminal, which use a telephony service using VNC according to an embodiment of the present invention.

FIG. 2 illustrates UI configurations for a first terminal and a second terminal, which use a telephony service using VNC according to an embodiment of the present invention.

Referring to FIG. 2, a first terminal's device, (a head unit or a car head unit) uses a second terminal device's, (a mobile device) UI by VNC. That is, the mobile terminal, when sending and receiving calls, displays its phone screen on the head unit for the user, by VNC.

Figure 3:
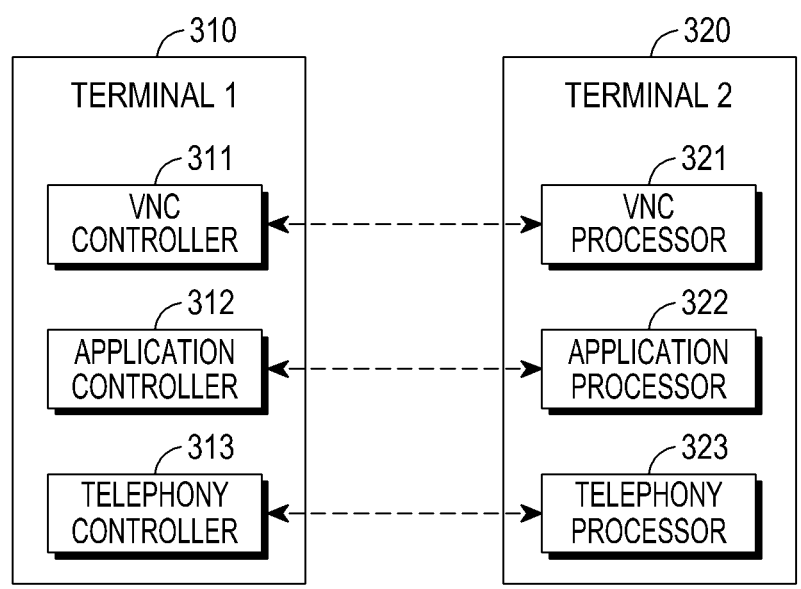
FIG. 3 illustrates a first terminal and a second terminal, according to an embodiment of the present invention.

FIG. 3 illustrates a first terminal and a second terminal, according to an embodiment of the present invention.

Referring to FIG. 3, a first terminal 310, e.g., a car head unit, includes a VNC controller 311, an application controller 312, and a telephony controller 313, and a second terminal 320, e.g., a mobile terminal, includes a VNC processor 321, an application processor 322, and a telephony processor 323. During VNC, the VNC controller 311 in the first terminal 310 serves as a common client, and the VNC processor 321 in the second terminal 320 serves as a common server. The application controller 312 and the telephony controller 313 in the first terminal 310 serve as CPs in a UPnP system, and the application processor 322 and the telephony processor 323 in the second terminal 320 serve as a server in the UPnP system.

The VNC controller 311 receives the displayed screen of the second terminal 320, which is provided from the VNC processor 321 in the second terminal 320, and displays it on a display screen of the first terminal 310. For example, the VNC controller 311 may be a VNC client adopted in common VNC technology, and the VNC processor 321 may be a VNC server adopted in common VNC technology.

The application controller 312 communicates with the application processor 322 in the second terminal 320 to request the running of mobile applications (e.g., a VNC server, a telephony-related application, etc.) existing in the second terminal 320. In response, the application processor 322 in the second terminal 320 runs the application requested by the application controller 321.

When connecting a call with the second terminal 320, the application controller 312 receives, from the second terminal 320, an application IDentifier (ID) or category information for an application to be run to provide the telephony service, and provides the application ID or category information to the application processor 322, before transmitting and receiving data for a call with the second terminal 320, to control running of the application to be run to provide the telephony service. In response, the application processor 322 runs an application corresponding to the application ID or category information.

Examples of the category information are shown in Table 1, Table 2, and Table 3 below. Specifically, Table 1 shows category information for the application to be run, Table 2 shows visual content information of the application to be run, and Table 3 shows audio content information of the application to be run.

TABLE 1

| Application Category | Application Sub-category | Description |
|---|---|---|
| 0x0000 | 0x0000 | Unknown Application |
| 0x0001 | 0x0000 | General UI Framework |
|  | 0x0001 | Home screen/Start-up Screen |
|  | 0x0002 | Menu |
|  | 0x0003 | Notification |
|  | 0x0004 | Application listing |
|  | 0x0005 | Settings |
| 0x0002 | 0x0000 | General Phone call application |
|  | 0x0001 | Contact list |
|  | 0x0002 | Call log |
| 0x0003 | 0x0000 | General Media applications |
|  | 0x0001 | Music |
|  | 0x0002 | Video |
|  | 0x0003 | Gaming |
|  | 0x0004 | Image |
| 0x0004 | 0x0000 | General Messaging applications |
|  | x0001 | SMS |
|  | x0002 | MMS |
|  | x0003 | Email |
| 0x0005 | 0x0000 | General Navigation |
| 0x0006 | 0x0000 | General Browser |
|  | 0x0001 | Application Store |

TABLE 1-continued

| Application Category | Application Sub-category | Description |
|---|---|---|
| 0x0007 | 0x0000 | General Productivity |
|  | 0x0001 | Document Viewer |
|  | 0x0002 | Document Editor |
| 0x0008 | 0x0000 | General Information |
|  | 0x0001 | News |
|  | 0x0002 | Weather |
|  | 0x0003 | Stocks |
|  | 0x0004 | Travel |
|  | 0x0005 | Sports |
|  | 0x0006 | Clock |
| 0x0009 | 0x0000 | General Social Networking |
| 0x000A | 0x0000 | General Personal Information Management |
|  | 0x0001 | Calendar |
|  | 0x0002 | Notes |
| 0xF000 | 0x0000 | General UI less applications |
|  | 0x0001 | Server functionality (use protocolID to identify the server protocol) |
|  | 0x0002 | Client functionality (use protocolID to identify the client protocol) |
|  | 0x0010 | Voice Command Engine |
| 0xFFFE | 0x0000–0xFFFF | Testing & Certification The use of this category will be specified in a separate "Testing and Certification" document. |
| 0xFFFF | 0x0000 | General System |
|  | 0x0001 | PIN input for Device unlock |
|  | 0x0002 | Bluetooth PIN code Input |
|  | 0x000F | Other password input |
|  | 0x0010 | Voice Command Confirmation |

TABLE 2

| Content Category (Bit) | Description |
|---|---|
| 0 | Text |
| 1 | Video |
| 2 | Image |
| 3 | Vector Graphics |
| 4 | 3D Graphics |
| 5 | User Interface (e.g. Application menu) |
| 16 | Car Mode |
| 31 | Miscellaneous content |

TABLE 3

| Content Category (Bit) | Description |
|---|---|
| 0 | Phone Audio |
| 1 | Media Audio Out |
| 2 | Media Audio In |
| 3 | Voice Command Out |
| 4 | Voice Command In |
| 31 | Miscellaneous content |

The telephony controller 313 communicates with the telephony processor 323 in the second terminal 320 to control provision of the telephony service under the VNC environment. Specifically, the telephony controller 313 receives a call notification message sent from the telephony processor 323, handles an operation (e.g., notifying the user of call reception, transmitting the user's response in a call approval message, receiving a response (call approval response) message to the call approval message, etc.) for the call connection, and transmits and receives data for the call.

For example, the telephony controller 313 may include a telephony CP commonly used in the UPnP technology, and the telephony processor 323 may include a telephony server.

When using the telephony CP commonly used in the UPnP technology, the telephony controller 313 also includes a separate media processor for transmitting and receiving streaming data of audio or visual data for the call. The telephony controller 313 further includes a telephony client commonly used in the UPnP technology, and the media processor may also be included in the telephony client. The media processor may also be provided independently in the first terminal 310, without being included in the telephony controller 313. An independent media processor is sufficient as long as it can transmit and receive streaming audio and/or visual data for the call.

The telephony processor 323 may provide the application identifier or category information to the telephony controller 313 using a call notification message or a call approval response message.

Figure 4:
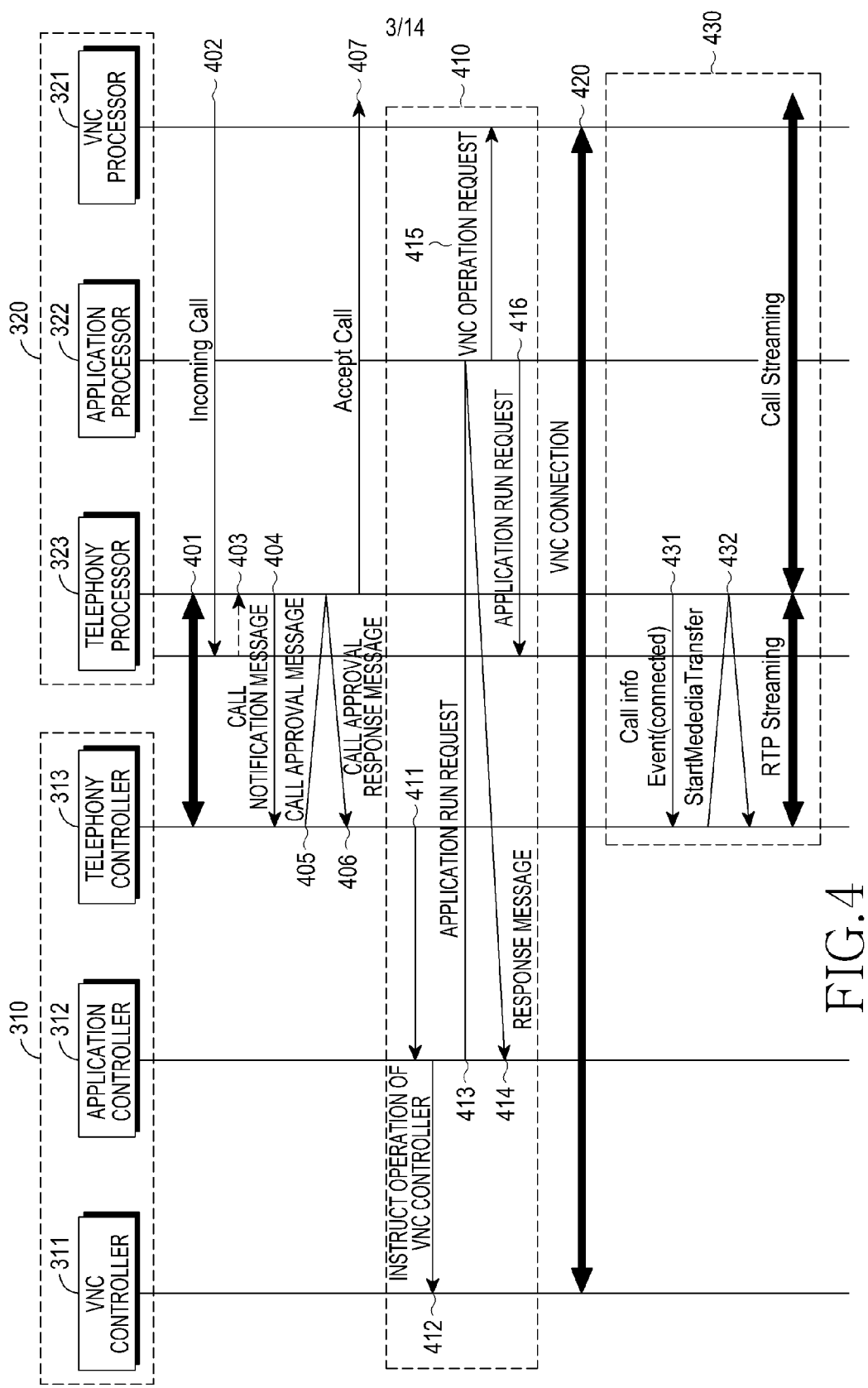
FIG. 4 illustrates a telephony service control method using VNC according to an embodiment of the present invention.

FIG. 4 illustrates a telephony service control method using VNC according to an embodiment of the present invention.

Referring to FIG. 4, in step 401, the first terminal 310 and the second terminal 320 connect to provide the telephony service. Specifically, after the first terminal 310 and the second terminal 320 perform a connection over a short-range communication network, the telephony controller 313 in the first terminal 310 and the telephony processor 323 in the second terminal 320 exchange description information in a discovery process.

In step 402, when the second terminal 320 receives a call from an external terminal (not shown), the telephony controller 313 and the telephony processor 323 check settings of the second terminal 320 to determine whether to automatically run an application for providing the telephony service or determine whether to run the application for providing the telephony service under control of the first terminal 310. When determining to automatically run an application for providing the telephony service, the telephony controller 313 and the telephony processor 323 automatically run the application for providing the telephony service, without performing steps 403 to 410, and then establish a VNC connection in step 420.

If a virtual network computing environment between the first terminal 310 and the second terminal 320 is connected in step 420, the application for providing the telephony service is automatically run, informing the user of call reception (i.e., reception of an incoming call). After checking a user's response, the telephony controller 313 and the telephony processor 323 provide the user's response results to the external terminal, and the user's response results may be information indicating Call or Reject.

In order to run the application for providing the telephony service under control of the first terminal 310, the second terminal 320 instructs the telephony processor 323 to operate in step 403. In step 404, the telephony processor 323 sends a call notification message to the telephony controller 313 in the first terminal 310, together with an application ID or category information for the application to run to provide the telephony service with the VNC processor 321 in the second terminal 320.

FIG. 5 illustrates an example of a call notification message according to an embodiment of the present invention.

In step 405, the telephony controller 313 informs the user of the call reception (i.e., reception of an incoming call), checks a user's response, and provides a call approval message including the user's response results to the telephony processor 323. For example, notification of the call reception may be achieved by a pop-up message, the user's response may be a button input to request connect or reject the call in response to the pop-up message.

In step 406, the telephony processor 323 sends a response message (call approval response message) for the reception of the call approval message. In step 407, the telephony processor 323 provides the call approval message to the external terminal.

In step 410, the first terminal 310 initiates a process for establishing a VNC connection with the second terminal 320. Specifically, in step 411, the telephony controller 313 requests the application controller 312 to establish a VNC connection and to control running of an application for providing the telephony service. In response, the application controller 312 instructs operation of the VNC controller 311 in step 412, and sends a request to run the application for providing the telephony service to the application processor 322 in the second terminal 320, in step 413. In step 413, the application ID or category information received through the call notification message is provided to the application processor 322.

In step 414, the application processor 322 sends a response to the command to the request to the application controller 312. The application processor 322 requests the VNC processor 321 to execute the VNC connection in step 415, and requests a controller of the second terminal 320 to run the application in step 416.

The response message sent in step 414 includes Uniform Resource Identifier (URI) information based on which an access to the application processor 322 may be made. Upon receiving the URI information, the application controller 312 transmits the URI information to the VNC controller 311.

In step 420, the VNC controller 311 and the VNC processor 321 complete the VNC connection. That is, the VNC controller 311 accesses the VNC processor 321 using the URI information. Accordingly, for the first terminal 310 and the second terminal 320, an environment is set in which the second terminal 320, which is connected by VNC, runs the application to provide the telephony service so that the intact UI being run by the application may be displayed on the first terminal 310.

Steps 410 and 420 may be performed after the telephony controller 313 receives the call notification message in step 404, or after a button is input or pushed by the user.

In step 430, the first terminal 310 performs the call with the external terminal using the UI being run by the application.

Specifically, in step 431, the telephony processor 323 transmits CallInfo Event information in which a 'Connected' state is set, to the telephony controller 313. In step 432, upon receiving the event, the telephony controller 313 in the first terminal 310 determines whether media streaming for a voice or video call is presently connected between the first terminal 310 and the second terminal 320, and sends a StartMediaTransfer action to the telephony processor 323 in the second terminal 320, if media streaming is not connected. Thereafter, the first terminal 310 and the second terminal 320 perform a call with the external terminal by transmitting and receiving the media streaming.

Although the method of connecting media streaming by invoking a StartMediaTransfer action has been described above, the present invention is not limited thereto, and the connection of media streaming may be applied in various ways by those of ordinary skill in the art.

Figure 6:
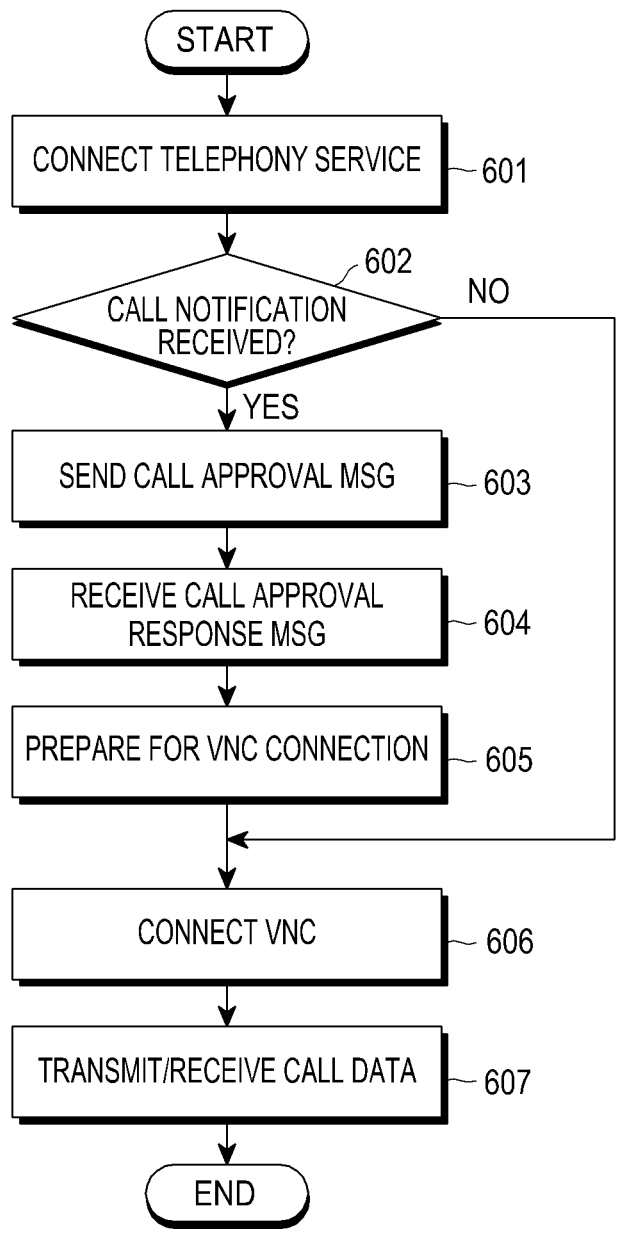
FIG. 6 is a flowchart illustrating an operation of a first terminal according to an embodiment of the present invention.

FIG. 6 is a flowchart illustrating an operation of a first terminal according to an embodiment of the present invention.

Referring to FIG. 6, in step 601, the first terminal establishes a connection for providing a telephony service with the second terminal. Specifically, after being connected with the second terminal over a short-range communication network, the first terminal exchanges description information with the second terminal in a discovery process.

Although not illustrated in FIG. 6, the second terminal determines whether to automatically run an application for providing the telephony service or to run the application for providing the telephony service under control of the first terminal. When determining to automatically run an application for providing the telephony service, the second terminal does not send a separate call notification message to the first terminal. However, when determining to run an application for providing the telephony service under control of the first terminal, the second terminal generates a call notification message. Therefore, upon receiving a call notification message from the second terminal, the first terminal runs the application for providing the telephony service.

Upon receiving a call notification message in step 602, the first terminal informs the user of the call reception (i.e., reception of an incoming call), checks a user's response, and sends a call approval message including the user's response results to the second terminal in step 603. For example, the call notification message may include an application ID or category information for an application to be run to provide the telephony service, and the call reception may be informed to the user by a pop-up message generated in the first terminal.

In step 604, the first terminal receives a response message (call approval response message) to the sent call approval message, and in step 605, the first terminal prepares to control a VNC connection with the second terminal. Specifically, the first terminal sends a command to the second terminal to request a connection of VNC and to request running of the application for providing the telephony service. The first terminal provides the second terminal with the application ID or category information received through the call notification message, and receives a response message to the command. The response message to the command may include URI information based on which the first terminal may access the VNC processor in the second terminal.

In step 606, the first terminal establishes a VNC connection with the second terminal, using the URI information.

Accordingly, an environment is set in which the first terminal and the second terminal are connected by VNC, and the second terminal runs an application for providing the telephony service, so the UI being run by the application on the second terminal is displayed on the first terminal.

In step 607, the first terminal performs a call connected with the external terminal, using the UI being run by the application. Specifically, the first terminal receives CallInfo Event information in which a 'Connected' state is set, from the second terminal. The first terminal determines whether media streaming for a voice or video call is presently connected with the second terminal, and sends a StartMediaTransfer action to the second terminal, if media streaming is not connected. After performing a connection of media streaming, the first terminal transmits and receives the media streaming.

Although the method of connecting media streaming by invoking a StartMediaTransfer action has been described above, the present invention is not limited thereto, and the connection of media streaming may be applied in various ways by those of ordinary skill in the art.

When an application for providing the telephony service is automatically run in the second terminal, a call that the second terminal has received is displayed on the first terminal by the application, after a VNC connection is made with the second terminal. Thereafter, because determining whether to connect the received call is achieved by the application of the second terminal based on VNC, the first terminal does not perform call connection-related operations when the application for providing the telephony service is automatically run in the second terminal. However, when the call is connected with the external terminal as the call connection is completed, the first terminal performs media streaming on the call data in step 607.

Figure 7:
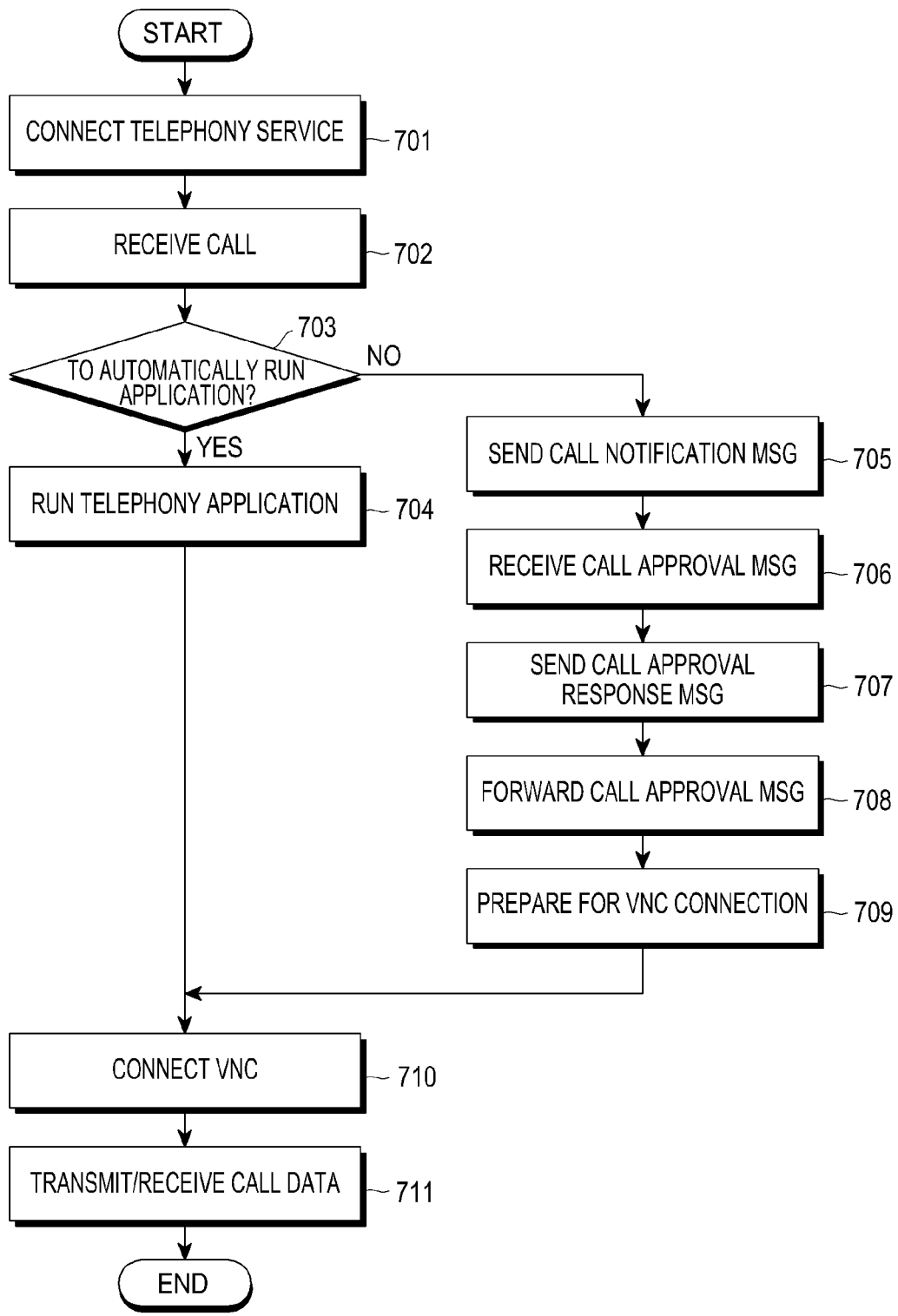
FIG. 7 is a flowchart illustrating an operation of a second terminal according to an embodiment of the present invention.

FIG. 7 is a flowchart illustrating an operation of a second terminal according to an embodiment of the present invention.

Referring to FIG. 7, in step 701, the second terminal establishes a connection for providing the telephony service with the first terminal. Specifically, after being connected with the first terminal over a short-range communication network, the second terminal exchanges description information with the first terminal in a discovery process.

In step 702, the second terminal receives a call from an external terminal.

In step 703, the second terminal determines whether to automatically run an application for providing the telephony service, or determines whether to run the application for providing the telephony service under control of the first terminal.

When determining to automatically run the application for providing the telephony service (Yes in step 703), the second terminal runs the application for providing the telephony service in step 704.

However, when determining to run the application for providing the telephony service under control of the first terminal (No in step 703), the second terminal generates a call notification message corresponding to the call from the external terminal and sends it to the first terminal in step 705. For example, the call notification message includes an application ID or category information for the application to be run to provide the telephony service.

In step 706, the second terminal receives a call approval message including a user response result from the first terminal. In step 707, the second terminal sends a response message (call approval response message) for the reception of the call approval message to the first terminal. In step 708, the second terminal forwards the call approval message to the external terminal.

In step 709, the second terminal prepares to control a VNC connection with the first terminal. Specifically, the second terminal receives, from the first terminal, a message requesting a VNC and running of an application for providing the telephony service. In response, the second terminal instructs running of the application, and provides the first terminal with URI information with which the first terminal may access a device for handling the VNC, in the second terminal.

In step 710, the second terminal establishes a VNC connection with the first terminal, and sets an environment in which the UI of the application being run by the second terminal is displayed on the first terminal.

In step 711, the second terminal transmits and receives call data to and from the first terminal. For example, the second terminal transmits CallInfo Event information in which a 'Connected' state is set, to the first terminal. The second terminal receives a StartMediaTransfer action from the first terminal, connects media streaming, and then transfers media streaming for a call, between the first terminal and the external terminal.

Figure 8:
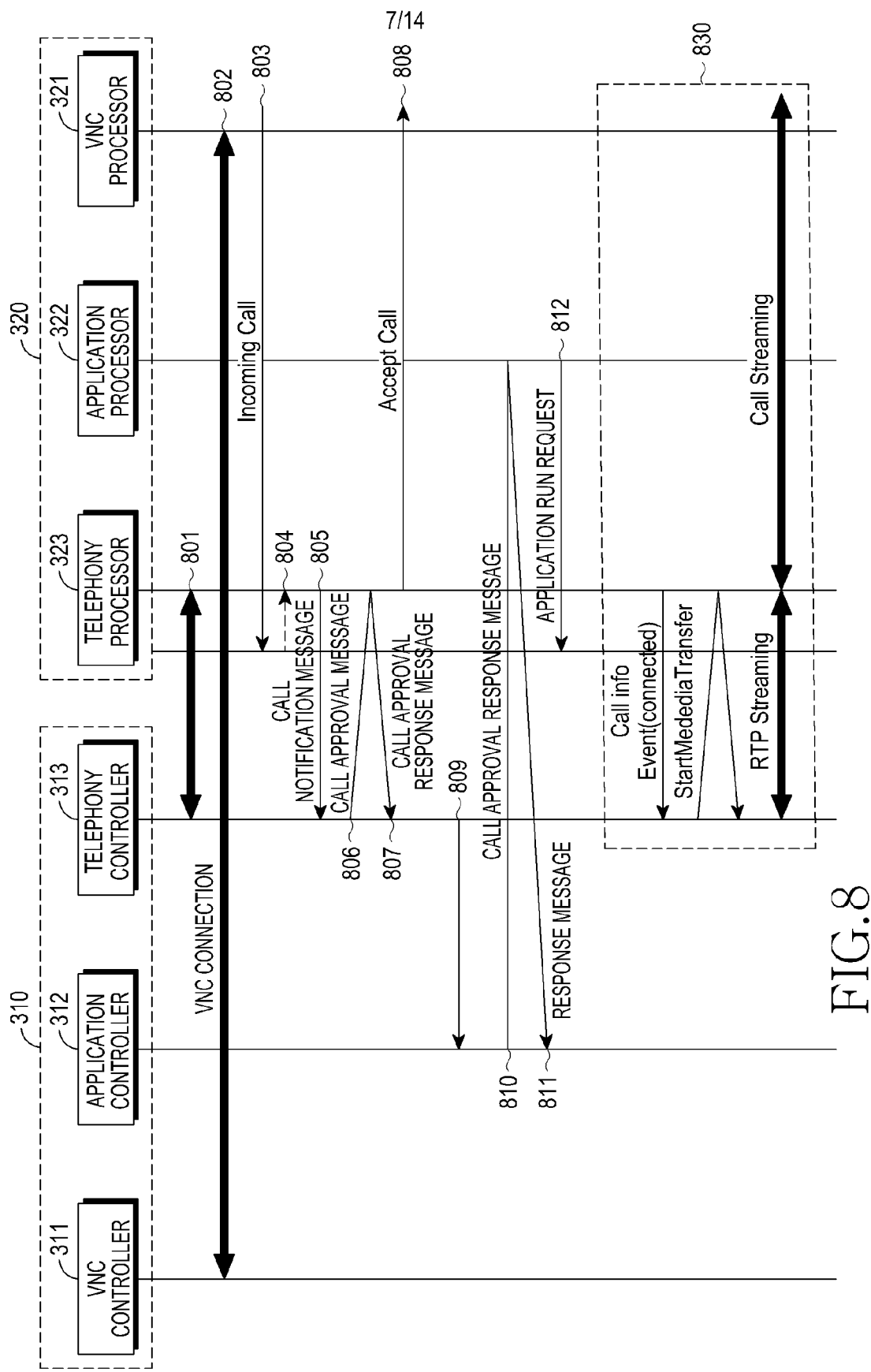
FIG. 8 illustrates an operation of a telephony service control method using VNC according to an embodiment of the present invention.

FIG. 8 illustrates an operation of a telephony service control method using VNC according to an embodiment of the present invention. Specifically, in FIG. 8, the second terminal forwards the call received from the external terminal to the first terminal, after establishing a VNC connection with the first terminal.

Referring to FIG. 8, in step 801, the first terminal 310 and the second terminal 320 establish a connection for providing the telephony service.

In step 802, the first terminal 310 and the second terminal 320 establish a VNC connection. For example, the VNC controller 311 checks or extracts URI information of the VNC processor 321 from the description information exchanged in step 801, and accesses the VNC processor 321 based on the URI information. Accordingly, an environment is set in which the first terminal 310 and the second terminal 320 are connected by VNC, and the second terminal 320 runs an application for providing the telephony service, so the UI being run by the application on the second terminal 320 is displayed on the first terminal 310.

Upon receiving a call from the external terminal in step 803, the second terminal checks settings of the second terminal itself, and determines whether to automatically run an application for providing the telephony service or determines whether to run the application for providing the telephony service under control of the first terminal. When determining to automatically run the application for providing the telephony service, the second terminal automatically runs the application for providing the telephony service without performing steps 804 to 812, and then directly proceeds to step 830, where the first terminal 810 performs the call connected with the external terminal, using the UI being run by the application.

When automatically running the application for providing the telephony service, the second terminal informs the user of the call reception (i.e., reception of an incoming call) using the application. The second terminal checks the user's response, and then provides the user's response results to the external terminal, and the user's response results may be information indicating to accept or reject the call.

In order to run the application for providing the telephony service under control of the first terminal 310, the second terminal 320 operates the telephony processor 323 in step 804, and the telephony processor 323 sends a call notification message to the telephony controller 313 in the first terminal 310 in step 805, together with an application ID or category information for the application to run to provide the telephony service with the VNC processor 321 in the second terminal 320.

In step 806, the telephony controller 313 informs the user of the call reception (i.e., reception of an incoming call), checks a user response, and provides a call notification message including the user response results to the telephony processor 323.

In step 807, the telephony processor 323 sends a response message (call approval response message) for the reception of the call approval message to the telephony controller 313.

FIG. 9 illustrates an example of a call approval response message according to an embodiment of the present invention.

In step 808, the telephony processor 323 transmits the call approval message to the external terminal.

Steps 809 to 812 describe a process of running the application for providing the telephony service under control of the first terminal 310.

Specifically, in step 809, the telephony controller 313 requests the application controller 312 to control running of the application for providing the telephony service. In response, the application controller 312 sends a command to request the application processor 322 in the second terminal to run the application for providing the telephony service in step 810. The application ID or category information received through the call approval response message is provided to the application processor 322. The application processor 322 sends a response to the command to request running of the application to the application controller 312 in step 811, and requests the controller of the second terminal to run the application in step 812.

Thereafter, in step 830, the first terminal performs the call connected with the external terminal, using the UI being run by the application. Step 830 is the same in operation as step 430, as described above.

Figure 10:
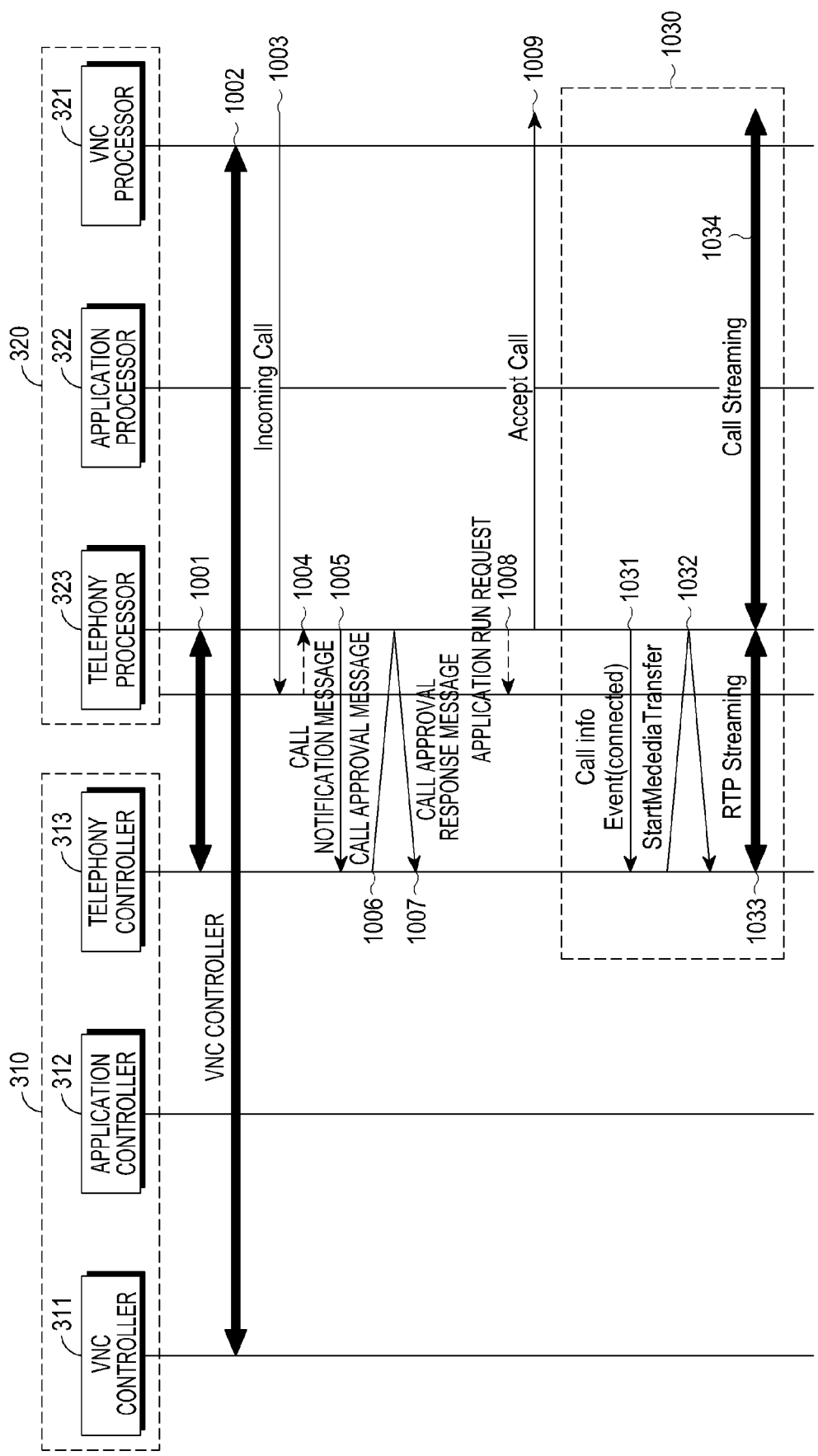
FIG. 10 illustrates an operation of a telephony service control method using VNC according to an embodiment of the present invention.

FIG. 10 illustrates an operation of a telephony service control method using VNC according to an embodiment of the present invention. Specifically, the operation in FIG. uses information included in a call approval message without an additional process for controlling the running of an application for providing the telephony service.

Referring to FIG. 10, step 1001, step 1002, and steps 1003 to 1007 are the same as step 801, step 802, and steps 803 to 807 in FIG. 8, as described above. Further, step 1030 is also the same as step 830 in FIG. 8.

After step 1007, the telephony processor 323 checks information included in the call approval message to determine an application ID or category information for the application for providing the telephony service. In step 1008, the second terminal 320 determines whether there is a VNC connection with the first terminal 310, and requests the controller of the second terminal 320 to run the application, if the VNC connection is established. In step 1009, the second terminal 320 provides the call approval message to the external terminal.

Although methods of processing a call received from an external terminal have been described above in the embodiments of the present invention, the present invention is not limited thereto. For example, the present invention may provide a method of transmitting a telephony-related application ID or category information to the second terminal (mobile terminal), and based thereon, may operate the UPnP Telephony service on the basis of VNC.

Figure 11:
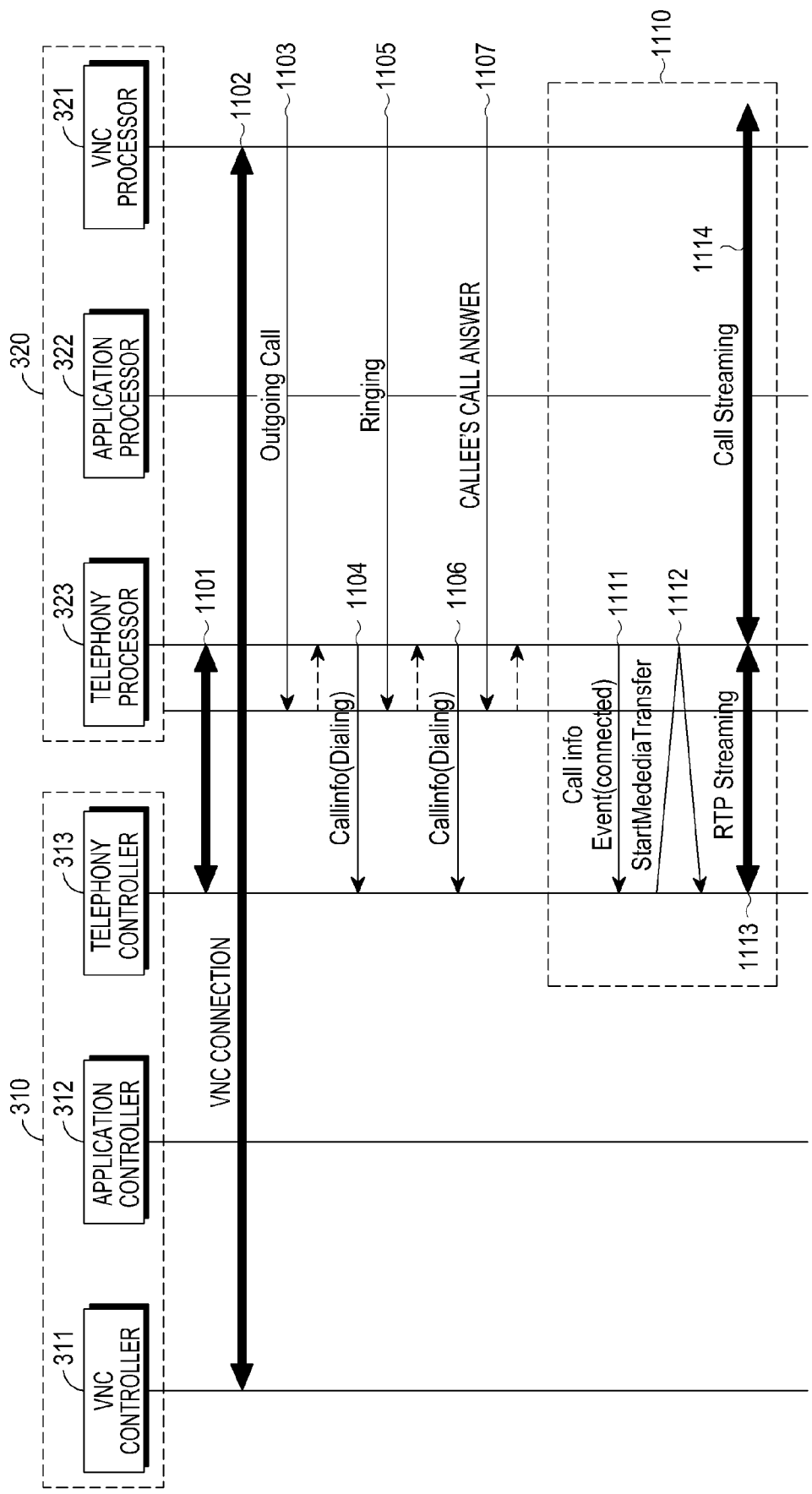
FIG. 11 illustrates an operation of a telephony service control method using VNC according to an embodiment of the present invention.

FIG. 11 illustrates an operation of a telephony service control method using VNC according to an embodiment of the present invention. Specifically, the operation in FIG. 11 processes a call generated in the second terminal, based on VNC, not a call received from an external terminal.

Referring to FIG. 11, in step 1101, a first terminal 310 and a second terminal 320 establish a connection for providing the telephony service. Specifically, after the first terminal 310 and the second terminal 320 establish a connection over a short-range communication network, the telephony controller 313 in the first terminal 310 and the telephony processor 323 in the second terminal 320 exchange description information in a discovery process.

In step 1102, the first terminal 310 and the second terminal 320 establish a VNC connection. For example, the VNC controller 311 checks or extracts URI information of the VNC processor 321 from the description information exchanged in step 1101, and accesses the VNC processor 321 based on the URI information. Accordingly, an environment is set in which the first terminal 310 and the second terminal 320 are connected by VNC, and the second terminal 320 runs an application for providing the telephony service, so the UI being run by the application on the second terminal 320 is displayed on the first terminal 310.

If the telephony-related application is run on a VNC client screen and a phone number is entered or a desired other party phone number is selected by the user on the telephony-related application, a control command is sent to the VNC processor 321 by the VNC controller 311.

In step 1003, the second terminal generates a call to an external terminal by attempting a call operation.

In step 1104, the telephony processor 323 of the second terminal 320 sends a Dialing CallInfo event message to the telephony controller 313 in the first terminal 310. Upon receiving a Ringing signal in step 1105 as the other party's call arrives, the telephony processor 323 in the second terminal 320 sends a Calling CallInfo event message to the telephony controller 313 in the first terminal 310 in step 1106.

If the other party responds to or answers the call in step 1107, the second terminal starts the call in step 1110. That is, the first terminal 310 performs the call connected with the external terminal, using the UI being run by the application. Specifically, in step 1111, the telephony processor 323 transmits CallInfo Event information in which a 'Connected' state is set, to the telephony controller 313. In step 1112, upon receiving the event, the telephony controller 313 in the first terminal 310 determines whether media streaming for a voice or video call is presently connected between the first terminal 310 and the second terminal 320, and sends a StartMediaTransfer action to the telephony processor 323 in the second terminal 320, if the media streaming is not connected. Thereafter, in steps 1113 and 1114, the first terminal 310 and the second terminal 320 may perform the call with the external terminal by exchanging the media streaming.

Figure 12:
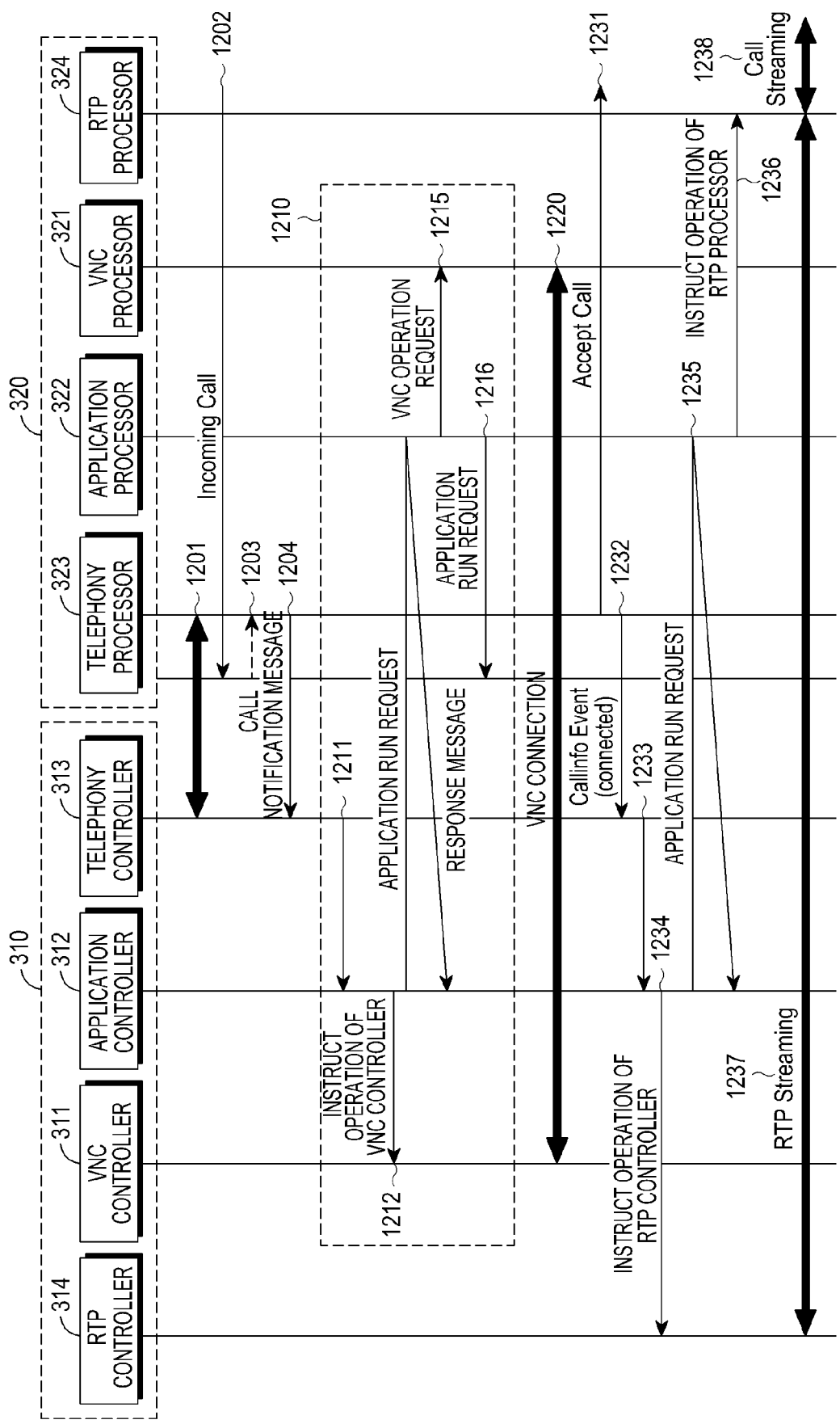
FIG. 12 illustrates an operation of a telephony service control method using VNC according to an embodiment of the present invention.

FIG. 12 illustrates an operation of a telephony service control method using VNC according to an embodiment of the present invention. Specifically, FIG. 12 illustrates a method of performing a VNC connection using an application ID or category information upon receiving a call notification message including a 'Ringing' state.

Specifically, the telephony service control method illustrated in FIG. 4 receives a call notification message, informs, by the first terminal 310, the user of the call reception (i.e., reception of an incoming call) using a UI created by the first terminal 310, checks a user response, sends a call approval message including the user response results to the telephony processor 323, and establishes a VNC connection. In contrast, in the telephony service control method illustrated in FIG. 12, after receiving a call notification message, a VNC connection is established without checking a user response. Thereafter, the user response is checked when VNC is connected and a telephony application of the second terminal 320 is run.

Accordingly, steps 1201 to 1204 in FIG. 12 are the same in operation as steps 401 to 404 in FIG. 4.

After performing step 1204, step 1210, preparing for a VNC connection, and step 1220, establishing the VNC connection, are performed. Steps 1210 and 1220 are the same as steps 410 and 420 in FIG. 4.

Thereafter, if the telephony application of the second terminal 320 is run, with the VNC connection being established, then the first terminal 310 informs the user of the call reception (i.e., reception of an incoming call) using the UI which is run as the telephony application is run, and checks a user's response. In step 1231, the second terminal 320 sends a call approval message including the user response result information to the external terminal.

Thereafter, the first terminal 310 performs the call connected with the external terminal using the UI being run by the application. A process of performing the call connected with the external terminal is the same as step 430 in FIG. 4, although the present invention is not limited thereto.

For example, if the first terminal 310 includes a media processor (a processor for transmitting and receiving streaming data of audio or video data for a call), which is implemented independently of the telephony controller 313, it may process streaming data of the audio or video data for a call as illustrated in FIG. 12.

Specifically, in step 1232, the telephony processor 323 transmits CallInfo Event information in which a 'Connected' state is set, to the telephony controller 313. In step 1233, upon receiving the event, the telephony controller 313 in the first terminal 310 determines whether media streaming for a voice or video call is presently connected between the first terminal 310 and the second terminal 320, and instructs the application controller 312 in the first terminal 310 to run the application for handling transmission/reception of media streaming for a call, if the media streaming is not connected.

In response, the application controller 312 instructs operation of a Real-time Transport Protocol (RTP) controller 314 for handling transmission/reception of media streaming in step 1234, and requests the application processor 322 in the second terminal 320 to run the application for handling transmission/reception of media streaming in step 1235. In step 1236, the application processor 322 in the second terminal 320 instructs operation of an RTP processor 324. Thereafter, the RTP controller 314 and the RTP processor 324 exchange the media streaming for a voice or video call between the first terminal 310 and the second terminal 320, performing a call with the external terminal, i.e., RTP and call streaming in steps 1237 and 1238.

Although the process of processing streaming data of the data has been described above where the first terminal 310 includes a media processor, which is implemented independently of the telephony controller in FIG. 12, the present invention is not limited thereto. For example, the streaming data process (i.e., steps 1232 to 1238) described in FIG. 12 may be applied to FIGS. 4, 8, 10, and 11.

Figure 13:
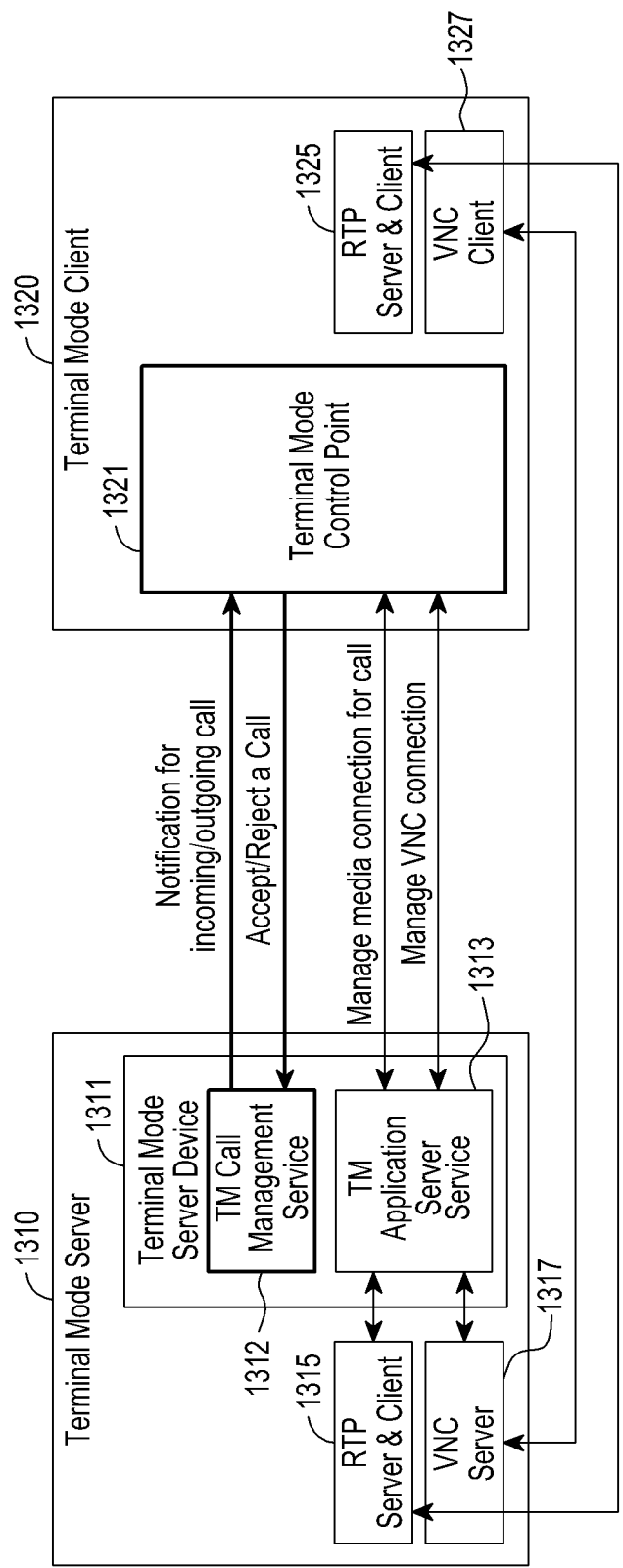
FIG. 13 illustrates architecture for applying a telephony service control method using VNC according to an embodiment of the present invention.

FIG. 13 illustrates an example of an in-vehicle communication device according to an embodiment of the present invention.

Referring to FIG. 13, the in-vehicle communication device includes a terminal mode server 1310 and a terminal mode client 1320. For example, the terminal mode server 1310 may be a mobile device such as a mobile communication terminal, and the terminal mode client 1320 may be a car head unit.

The terminal mode server 1310 includes a terminal mode server device module 1311 for UPnP communication, and the terminal mode server device module 1311 includes a Terminal Mode (TM) call management service module 1312 and a TM application server service module 1313. The TM call management service module 1312 performs call management and call notification.

Specifically, upon generation or reception of a call, the TM call management service module 1312 generates a notification for the call generation or reception, sends the notification to the terminal mode client 1320, and receives an accept or reject indication for the generated or received call from the terminal mode client 1320, performing call handling (call connection or call termination) corresponding to the received results.

The TM application server service module 1313 runs/terminates an application(s) existing in the terminal mode server 1310, or fetches an application list (or perform application management). Specifically, the TM application server service module 1313 transmits/receives media for application running, performs transmission/reception handling with the terminal mode client 1320, and/or manages VNC connection with the terminal mode client 1320.

The terminal mode client 1320 includes a terminal mode control point 1321, and sends a command to the TM application server service module 1313 to run an RTP server/client module 1315 in the terminal mode server 1310 for media streaming connection (e.g., RTP connection) for a call between the terminal mode server 1310 and the terminal mode client 1320. The terminal mode client 1320 also sends a command to request VNC connection to the TM application server service module 1313 in order to handle a VNC connection operation for displaying the intact screen of the terminal mode server 1310 on the terminal mode client 1320, for the user.

Figure 14:
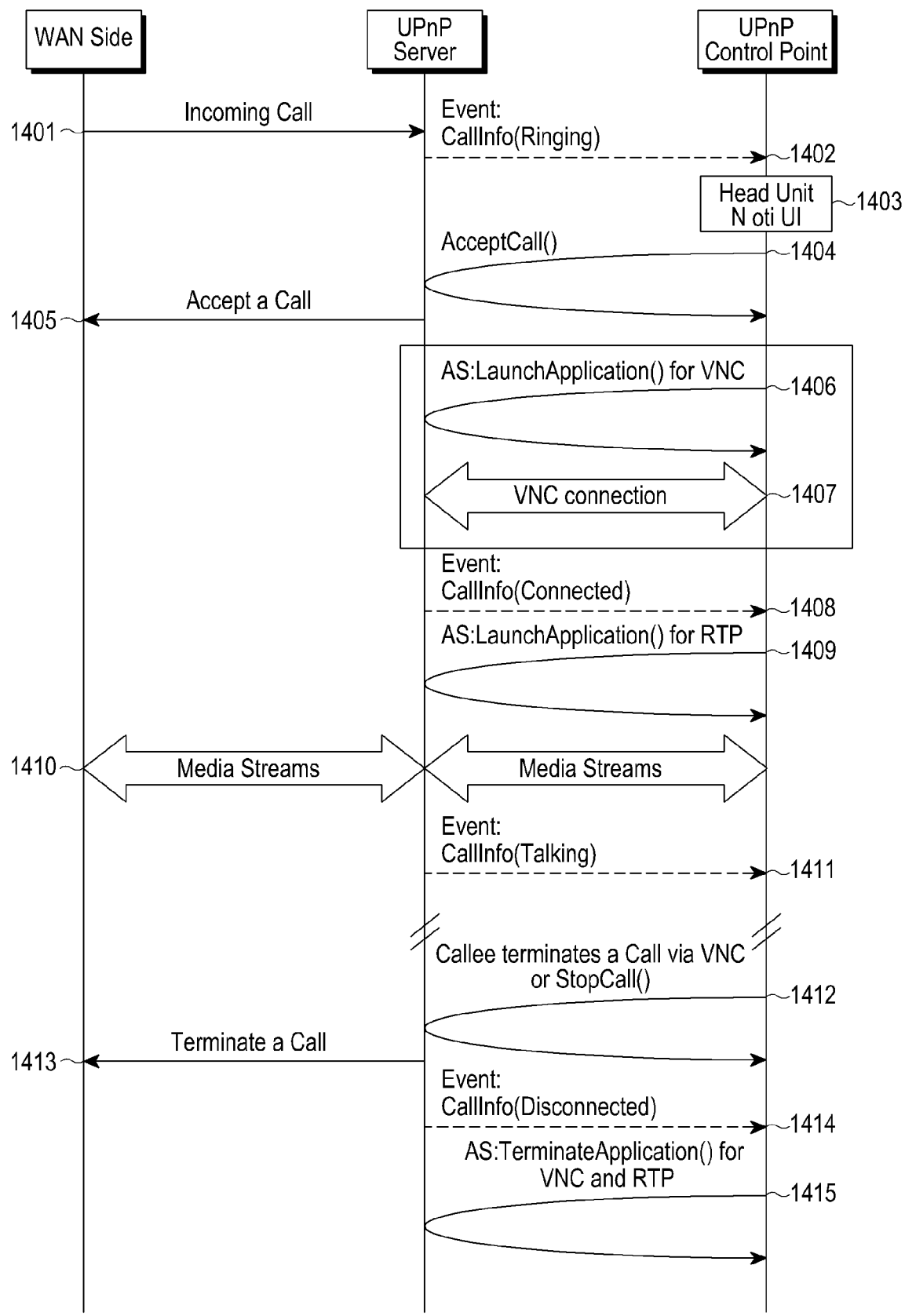
FIG. 14 is a signal flow diagram for managing incoming calls using a notification UI provided by an in-vehicle communication device of a telephony service control method using VNC according to an embodiment of the present invention.

FIG. 14 is a signal flow diagram for managing incoming calls using a notification UI provided by an in-vehicle communication device using a telephony service control method using VNC according to an embodiment of the present invention.

Referring to FIG. 14, an incoming call signal is generated in step 1401, and the terminal mode server 1310 serving as a UPnP server transmits a CallInfo event containing a "Ringing" state to the terminal mode client 1320 serving as a UPnP control point in step 1402. Specifically, when an incoming call signal is generated and transmitted to the terminal mode server 1310 over a Wide Area Network (WAN) side, the terminal mode server device module 1311 notifies the terminal mode control point 1321 of CallInfo containing a "Ringing" state.

In step 1403, the terminal mode control point 1321 creates a notification UI indicating call reception and displays it on the car head unit UI, for the user.

If an Accept button indicating an intention to answer the call is chosen by the user on the notification UI, an AcceptCall action defined by UPnP is sent to the terminal mode server device module 1311 in step 1404. Upon receiving the action, the terminal mode server device module 1311 sends a signal indicating the acceptance of the call to the WAN side in step 1405.

In step 1406, the terminal mode control point 1321 drives a VNC client 1327 in the terminal mode client 1320, and then sends a UPnP LaunchApplication action for driving VNC to the TM application server service module 1313, to drive a VNC server 1317. In step 1407, an address that the VNC client 1327 uses to access the VNC server 1317 is transmitted as a return value of the UPnP LaunchApplication action, and the VNC client 1327 in the terminal mode client 1320 accesses the VNC server 1317 in the mobile device based on the address. Thereafter, the user may control the screen of the terminal mode server 1310 on the screen provided by the VNC client 1327 in the terminal mode client 1320.

In step 1408, the terminal mode server device module 1311 transmits CallInfo Event information in which a 'Connected' state is set, to the terminal mode control point 1321. In step 1409, the terminal mode control point 1321 drives an RTP server/client module 1325 in the terminal mode client 1320 for the current voice or video call, and sends a UPnP LaunchApplication action for driving RTP to the TM application server service module 1313, to drive the RTP server/client module 1315.

Thereafter, in step 1410, the terminal mode server 1310 and the terminal mode client 1320 exchange media streaming to perform a call with the external terminal. In step 1411, the terminal mode server device module 1311 transmits CallInfo Event information in which a 'talking' state is set, to the terminal mode control point 1321.

In step 1412, if a Call End button is input or pushed by the user or a response message to a StopCall action is received, the terminal mode control point 1321 forwards the StopCall action to the TM application server service module 1313 to stop the call. In step 1413, the terminal mode server device module 1311 requests the device (e.g., WAN side), in which the call is generated, to terminate the call.

In step 1414, the terminal mode server device module 1311 transmits CallInfo Event information in which a 'Disconnected' state is set, to the terminal mode control point 1321.

In step 1415, the terminal mode control point 1321 terminates operations of the RTP server/client module 1325 and the VNC client 1327 which are presently driving a voice or video call, and sends a TerminationApplication action for requesting termination of operations of the RTP server/client module 1315 and the VNC server 1317 to the TM application server service module 1313, to terminate operations of the RTP server/client module 1315 and the VNC server 1317.

Figure 15:
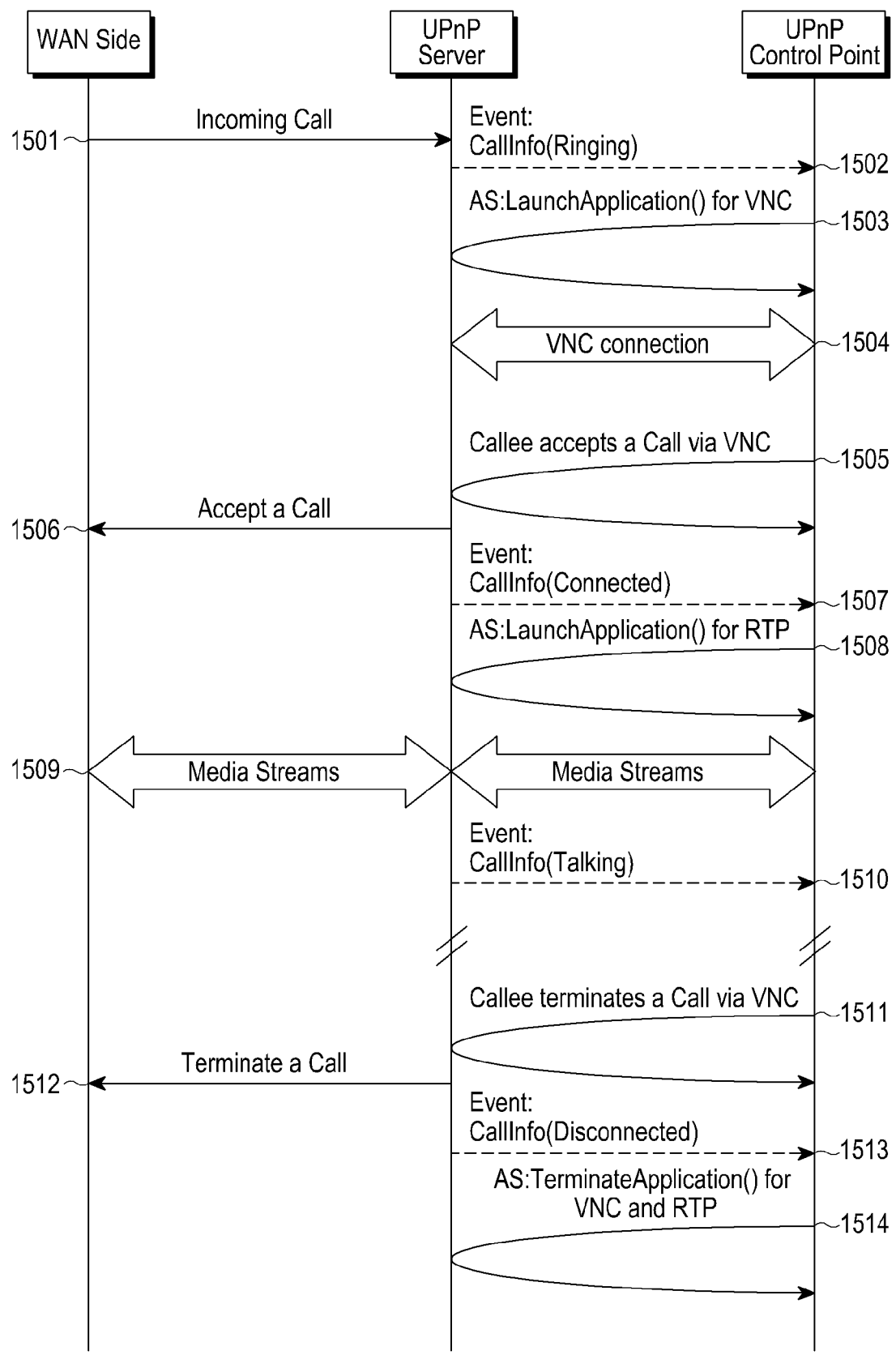
FIG. 15 is a signal flow diagram for managing incoming calls in an in-vehicle communication device with no notification UI, of a telephony service control method using VNC according to an embodiment of the present invention.

FIG. 15 is a flow diagram for managing incoming calls in an in-vehicle communication device with no notification UI, using a telephony service control method using VNC according to an embodiment of the present invention.

Referring to FIG. 15, an incoming call signal is received at the terminal mode server 1310 over the WAN side in step 1501, and the terminal mode server device module 1311 notifies a UPnP Control Point of a CallInfo event containing a "Ringing" state through the terminal mode control point 1321 in step 1502. In step 1503, the terminal mode control point 1321 drives the VNC client 1327 in the terminal mode client 1320 (e.g., car head unit), and the terminal mode control point 1321 sends a UPnP LaunchApplication action for driving VNC to the TM application server service module 1313 to drive the VNC server 1317. In step 1504, an address that the VNC client 1327 may use to access the VNC server 1317 is transmitted as a return value of the UPnP LaunchApplication action, and the VNC client 1327 in the terminal mode client 1320 accesses the VNC server 1317 in the mobile device based on the address. The user may answer or reject the call on the notification UI indicating call reception, provided by the VNC server 1317, i.e., the terminal mode server 1310 (e.g., a mobile device), on the screen of the VNC client 1327.

In step 1505, if an Accept button is input or pushed by the user, the UI provided by the terminal mode server 1310 is changed to a call UI, and the user views the call UI on the VNC client unit 1327.

In step 1506, the terminal mode server device module 1311 sends a signal indicating the acceptance of the call to the WAN side. In step 1507, the terminal mode server device module 1311 transmits CallInfo Event information in which a 'Connected' state is set, to the terminal mode control point 1321.

In step 1508, the terminal mode control point 1321 drives the RTP server/client module 1325 in the terminal mode client 1320 for a current voice or video call, and then sends a UPnP LaunchApplication action for driving RTP to the TM application server service module 1313, to drive the RTP server/client module 1315.

Thereafter, in step 1509, the terminal mode server 1310 and the terminal mode client 1320 exchange media streaming to perform a call with the external terminal.

In step 1510, the terminal mode server device module 1311 transmits CallInfo Event information in which a 'talking' state is set, to the terminal mode control point 1321.

In step 1511, if a Call End button is input or pushed by the user or a response message to a StopCall action is received, the terminal mode control point 1321 forwards the StopCall action to the TM application server service module 1313 to stop the call. In step 1512, the terminal mode server device module 1311 requests the device (e.g., WAN side), in which the call is generated, to terminate the call.

In step 1513, the terminal mode server device module 1311 transmits CallInfo Event information in which a 'Disconnected' state is set, to the terminal mode control point 1321.

In step 1514, the terminal mode control point 1321 terminates operations of the RTP server/client module 1325 and the VNC client unit 1327, which are presently driving the voice or video call, and sends a TerminationApplication action for requesting termination of the operations of the RTP server/client module 1315 and the VNC server 1317 to the TM application server service module 1313, to terminate operations of the RTP server/client module 1315 and the VNC server 1317.

As is apparent from the foregoing description, as it operates on the basis of VNC, UPnP Telephony may provide the same UI environment as that provided by the mobile device, to a head unit, making it possible to provide consistent UI to the user. Thus, vehicle manufacturers do not need additional implementation of UI during implementation of UPnP Telephony, because the UI provided by the mobile devices may be used.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for controlling a telephony service by a head unit device using Virtual Network Computing (VNC) connected between the head unit device and a mobile terminal, the method comprising:
   establishing a connection with the mobile terminal for providing the telephony service with the mobile terminal by exchanging description information through a short-range communication network;
   determining whether to establish a VNC connection with the mobile terminal under control of the head unit device or automatically, based on whether to receive a call reception notification message from the mobile terminal;
   establishing the VNC connection with the mobile terminal, based on the determination result; and
   transmitting and receiving data for a call of an external terminal to and from the mobile terminal through the VNC connection.

2. The method of claim 1, further comprising establishing a call connection with the external terminal by:
   receiving the call reception notification message from the mobile terminal that has received a call generated by the external terminal; and
   sending a call approval message in response to the call reception notification message.

3. The method of claim 2, wherein the call reception notification message includes an application identifier or category information for an application to be run in the mobile terminal to provide the telephony service.

4. The method of claim 2, further comprising receiving a response message to the call approval message, the response message including an application identifier or category information for an application to be run in the mobile terminal to provide the telephony service.

5. The method of claim 1, wherein the VNC connection between the head unit device and the mobile terminal is established after the call connection is established with the external terminal.

6. The method of claim 1, wherein the VNC connection between the head unit device and the mobile terminal is established before the call connection is established with the external terminal.

7. A method for processing a telephony service by a mobile terminal using Virtual Network Computing (VNC) connected between a head unit device and the mobile terminal, the method comprising:
- establishing a connection with the head unit device for providing the telephony service with the head unit device by exchanging description information through a short-range communication network;
- determining whether to execute an application for providing the telephony service automatically or under control of the head unit device upon receiving a call from an external terminal;
- establishing a VNC connection with the head unit device based on the determination result; and
- transmitting and receiving data for the call to and from the head unit device through the VNC connection.

8. The method of claim 7, further comprising establishing a call connection with the external terminal by:
- receiving the call generated by the external terminal;
- sending a call reception notification message notifying call reception, to the head unit device;
- receiving a call approval message from the head unit device in response to the call reception notification message; and
- forwarding the call approval message to the external terminal.

9. The method of claim 8, wherein the call reception notification message includes an application identifier or category information for an application to be run to provide the telephony service.

10. The method of claim 8, further comprising sending a response message to the call approval message to the head unit device, wherein the response message includes an application identifier or category information for an application to be run to provide the telephony service.

11. The method of claim 7, wherein the VNC connection is established between the head unit device and the mobile terminal after the call connection between the head unit device and the external terminal is established.

12. The method of claim 7, wherein the VNC connection is established between the head unit device and the mobile terminal before the call connection between the head unit device and the external terminal is established.

13. A head unit device for controlling a telephony service using Virtual Network Computing (VNC) connected between the head unit device and a mobile terminal, the head unit device comprising:
- a telephony controller that controls a connection with the mobile terminal for providing the telephony service, and transmits and receives data for a call of an external terminal to and from the mobile terminal through a VNC connection;
- an application controller that controls running an application in the mobile terminal to provide the telephony service; and
- a VNC controller that establishes the VNC connection with the mobile terminal under control of the head unit device or automatically, based on whether to receive a call reception notification message from the mobile terminal.

14. A mobile terminal for processing a telephony service using Virtual Network Computing (VNC) connected between a head unit device and the mobile terminal, the mobile terminal comprising:
- a telephony processor that provides a connection with the head unit device for providing the telephony service, determines whether to execute an application for providing the telephony service automatically or under control of the head unit device upon receiving a call from an external terminal, and transmits and receives data for the call to and from the head unit device through a VNC connection;
- an application processor that runs the application for providing the telephony service based on the determination result; and
- a VNC processor for establishing the VNC connection with the head unit device, based on the determination result.

15. The method of claim 1, wherein determining whether to establish the VNC connection with the mobile terminal under the control of the head unit or automatically comprises:
- determining to establish the VNC connection with the mobile terminal under the control of the head under, when the call reception notification message is received from the mobile terminal; and
- determining to establish the VNC connection with the mobile terminal automatically, when the call reception notification message is not received from the mobile terminal.

16. The method of claim 15, wherein establishing the VNC connection with the mobile terminal comprises:
- sending a request to execute an application for providing the telephony service to the mobile terminal, when establishing VNC connection with the mobile terminal under control of the head unit device;
- receiving a response message to the request, including the VNC connection information, from the mobile terminal; and
- establishing the VNC connection with the mobile terminal using the VNC connection information included in the response message.

17. The method of claim 16, wherein the VNC connection information includes Uniform Resource Identifier (URI) information.

18. The method of claim 15, wherein establishing the VNC connection with the mobile terminal comprises:
- checking the VNC connection information from the description information, when establishing the VNC connection with the mobile terminal automatically; and
- establishing the VNC connection with the mobile terminal using the checked VNC connection information.

19. The method of claim 18, wherein the VNC connection information includes Uniform Resource Identifier (URI) information.

* * * * *